2,809,880
PRODUCTION OF MAGNESIUM OXIDE

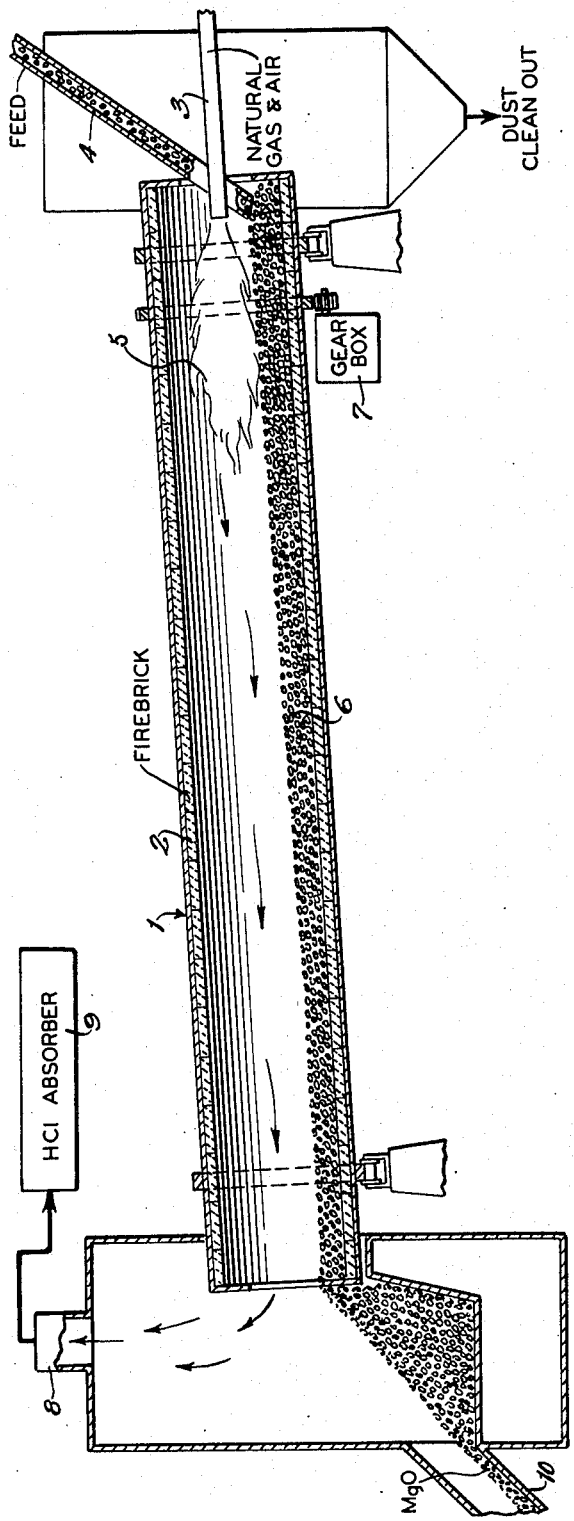

William B. Dancy, Carlsbad, N. Mex., Gunter H. Gloss, Lake Bluff, Ill., and Walter R. Shaw, Carlsbad, N. Mex., assignors to International Minerals & Chemical Corporation, a corporation of New York Application May 5, 1955, Serial No. 506,276

21 Claims. (Cl. 23—201)

This invention concerns the production of magnesium oxide, and more particularly, the production of magnesium oxide by the decomposition of a magnesium chloride hydrate.

It is known that magnesium chloride hexahydrate may be decomposed by heat to magnesium oxide, and a number of procedures for carrying out such a reaction have been utilized in the past. According to one process, magnesium chloride hexahydrate is heated with high pressure steam to effect the decomposition. This procedure is disadvantageous because the hydrogen chloride produced as a co-product mixes with the steam forming a very dilute hydrochloric acid having small commercial value. Another process for decomposing magnesium chloride calls for atomizing a solution or melt of magnesium chloride and passing the atomized liquid particles upwardly through a reaction chamber along with steam at a temperature of the order of about 1500° C. or higher. The use of steam as a heating medium again results in the production of a hydrochloric acid so dilute that it has little commercial value.

Attempts to decompose magnesium chloride hydrates to magnesium oxide without using steam as a heat source have met with failure. The reaction mass usually melts during the reaction and then fuses to become firmly fixed to the walls of the furnace. In a rotary furnace this adhesion of the reaction mass to the walls produces "ringing," prevents uniform decomposition of the magnesium chloride hydrate and lowers efficiencies to the point where economical operation is impossible. Usually operations can be maintained for but a few hours under such conditions before a shutdown is necessary for the purpose of cleaning the fused material from the kiln. Often the fused mass is so strongly adhered to the walls of the furnace that it can be removed only by chipping it away manually, often with serious damage to the walls of the furnace.

One object of this invention is to produce magnesium oxide from solid phase magnesium chloride hydrate.

Another object of this invention is to produce magnesium oxide from a magnesium chloride hydrate containing an average of between about 1.5 moles and about 3 moles of water of hydration per mole of magnesium chloride.

Another object of this invention is to produce magnesium oxide by decomposing a magnesium chloride hydrate in the solid phase and without melting.

Still another object of this invention is to produce magnesium oxide from a mixture containing a major amount of magnesium chloride dihydrate and a minor amount of magnesium chloride tetrahydrate and to simultaneously produce hydrogen chloride gas which can be converted to commercial strength hydrochloric acid economically.

A further object of this invention is to produce magnesium oxide by the decomposiiton of a solid phase mixture of magnesium chloride dihydrate and magnesium chloride tetrahydrate in a rotary furnace without melting and without "ringing" of the furnace walls.

The term "magnesium chloride hydrate" as used in the specification and claims refers to a magnesium chloride hydrate containing an average of between about 1.5 moles and about 3 moles of water of hydration per mole of magnesium chloride and includes magnesium chloride dihydrate alone or in admixture with magnesium chloride tetrahydrate or magnesium chloride monohydrate. The magnesium chloride hydrate utilized in this invention desirably is relatively free of magnesium chloride hexahydrate and anhydrous magnesium chloride, and preferably, is completely free of these compounds. These latter materials have relatively low melting points, particularly in the presence of alkali metal chlorides and sulfate compounds, and their presence in the reaction mass in large amounts tends to produce fusion of the reaction mass during the decomposition reaction with a substantial loss in efficiency of the reaction. The quality of anhydrous magnesium chloride should not exceed about 10%, by weight, of the magnesium chloride hydrate feed material, and preferably should be less than about 5% on this basis. Magnesium chloride hexahydrate, if present, should not amount to more than about 20%, by weight, and preferably, should amount to less than about 10% on the same basis. When the decomposition reaction is carried out in a rotary furnace, the presence in the feed magnesium chloride hydrate of substantial quantities of either anhydrous magnesium chloride or magnesium chloride hexahydrate results in a "ringing" of the furnace and a substantial lowering in efficiency. The decomposition reaction of this invention is carried out in a manner which minimizes the formation of anhydrous magnesium chloride.

In accordance with this invention, magnesium oxide and hydrogen chloride gas are produced by heating a solid phase magnesium chloride hydrate rapidly to its decomposition temperature. The decomposition is effected without melting of the magnesium chloride hydrate and without adhesion of the reaction mixture to the walls of the reaction vessel. The hydrogen chloride gas given off during the decomposition may be readily absorbed in water to produce concentrated hydrochloric acid which, like the magnesium oxide reaction product, is useful as a product of commerce.

More particularly, this invention is carried out by heating a solid phase magnesium chloride hydrate to its decomposition temperature rapidly enough so that the magnesium chloride hydrate, upon reaching the decomposition temperature, will contain at least about 1 mole of water of hydration per mole of magnesium chloride. The decomposition temperature referred to is the lowest temperature (about 400° C.) at which the magnesium chloride will react with water—either its water of hydration or water in the atmosphere—to form magnesium oxide and hydrogen chloride. The rise in temperature of the magnesium chloride hydrate must be sufficiently rapid to prevent the magnesium chloride hydrate from reaching equilibrium conditions with any of its phases prior to attaining the minimum decomposition temperature, that is, equilibrium with anhydrous magnesium chloride, magnesium chloride monohydrate, or the like.

The minimum rate of heating of the magnesium chloride hydrate, which is necessary to effect decomposition without melting, is dependent upon the atmosphere above the magnesium chloride hydrate during the heating. Customarily, the magnesium chloride hydrate to be decomposed in accordance with this invention will be near room temperature prior to being charged in the decomposition furnace. Desirably, the magnesium chloride hydrate will be heated in the furnace to the decomposition temperature, that is, to a temperature of at least about 400° C. as rapidly as possible. The heating may be effected using indirect or direct heat, but it is preferred to carry out the reaction in a direct-fired furnace. If the heating of the magnesium chloride hydrate is sufficiently rapid, the composition of the atmosphere above the magnesium chloride hydrate is relatively unimportant from the standpoint of the efficiency of the decomposition reaction itself. Preferably, the heating to the decomposition temperature is effected in less than about 30 minutes, and preferably less than about 15 minutes, but if care is taken to maintain the hydrogen chloride concentration in the atmosphere in contact with the reaction mass to less than about 10%, by weight, and the moisture content of the atmosphere at a concentration of at least about 10%, by weight, the heating to the decomposition temperature may be at a rate as low as about 10° C. per minute, that is, the heating of the material from room or atmospheric temperature to the minimum decomposition temperature of about 400° C. may take about 40 minutes. With hydrogen chloride concentration lower than about 5%, by weight, the rate of heating may be proportionately slower.

The atmosphere in contact with the reaction mass during its residence in the furnace must contain less than about 30% water, by weight, and preferably less than about 25% water, by weight. The presence of more than about 30% water in the atmosphere is avoided as adversely affecting the efficiency and commercial practicality of the process. If more than about 30% water is present, the concentration of the hydrochloric acid obtained by the process is too dilute to have commercial value. It is not marketable as such and the cost of recovery and concentration is uneconomic.

A solid phase magnesium chloride hydrate is decomposed in accordance with this invention at a temperature between about 400° C. and about 800° C. Preferably, the reaction is carried out by heating the magnesium chloride hydrate to a temperature between about 550° C. and about 800° C., the heating of the magnesium chloride hydrate being effected by means of a flame of burning combustion gases just above the surface of the reaction mass, and preferably in contact with the reaction mass. The decomposition of magnesium chloride hydrate to magnesium oxide is substantially more complete and efficient at temperatures above about 500° C. The flame should be an oxidizing flame capable of imparting to the reaction mass at least about 1400 B. t. u. per pound of magnesium chloride hydrate, and preferably at least about 2500 B. t. u. per pound of hydrate bed. The maximum temperature in the furnace preferably should not exceed about 800° C. Above this temperature undesirable gaseous sulfur compounds are formed from sulfate impurities in the feed material and contaminate the hydrochloric acid product. Similarly, the use of a reducing flame, rather than an oxidizing flame, in a direct-fired furnace may result in the formation of undesirable gaseous sulfur compounds as a result of the reduction of the sulfate impurities in the feed material and these gases also contaminate the hydrochloric acid produced in the process. Under carefully controlled conditions, however, a reducing flame and/or a reducing atmosphere is very beneficial as producing a product of high magnesium oxide content.

The magnesium chloride hydrate utilized in this invention preferably is substantially entirely magnesium chloride dihydrate. This material can be prepared by the dehydration of magnesium chloride tetrahydrate or magnesium chloride hexahydrate. It is extremely difficult, however, to produce magnesium chloride dihydrate which is uncontaminated with another magnesium chloride hydrate.

The process may be carried out using a magnesium chloride hydrate comprising essentially a mixture of magnesium chloride monohydrate, magnesium chloride dihydrate and magnesium chloride tetrahydrate and having an average degree of hydration of between about 1.5 moles and about 3.0 moles of water of hydration per mole of magnesium chloride. Magnesium chloride hydrate prepared by the controlled dehydration of magnesium chloride hexahydrate is usually free from anhydrous magnesium chloride or magnesium chloride hexahydrate, and comprises essentially a major amount of magnesium chloride dihydrate and a minor amount of magnesium chloride tetrahydrate. Such a mixture is a preferred feed material in operating in accordance with this invention. Preferably, the feed material will have an average degree of hydration of between about 2.0 moles of water and about 2.6 moles of water of hydration per mole of magnesium chloride.

After the magnesium chloride hydrate has been heated to its decomposition temperature, it is maintained at the decomposition temperature until the decomposition to magnesium oxide and hydrogen chloride is substantially entirely complete. Usually complete decomposition is effected from between about 30 minutes and about 120 minutes at a temperature between about 400° C. and about 800° C. When operating within the preferred decomposition temperature limits of between about 550° C. and about 800° C. complete decomposition can be effected from between about 30 minutes and about an hour after reaching the decomposition temperature. The reaction time necessary for complete decomposition can be shortened by operating at a temperature in excess of 800° C., but the increase in the rate of decomposition at these elevated temperatures will usually not offset the increased cost of maintaining the higher reaction temperatures nor the cost of removing contaminants from the reaction products.

It is not necessary that the feed magnesium chloride hydrate be free of non-magnesium salts, but it is essential that the magnesium chloride hydrate utilized in the process of this invention contain less than about 6% alkali metal chlorides and less than about 4% potassium chloride. The presence of more than about 6% alkali metal chlorides or more than about 4% potassium chloride in the feed material results in fusion of the reaction mass at the higher decomposition temperatures and adhesion of the reaction mixture to the walls of the furnace, thereby preventing the process from being carried out on a commercially economical basis due to the frequent shutdowns required for cleaning.

In a preferred embodiment of this invention, the decomposition of magnesium chloride hydrate is carried out by heating the magnesium chloride hydrate directly in the presence of burning combustible gases, such as natural gas. Any suitable furnace, such as a rotary furnace or multiple hearth furnace, may be employed. The flame of the burning gases is positioned to produce the most rapid temperature rise in the magnesium chloride hydrate. Usually the flame is maintained as close as possible to the surface of the solid reaction mixture and is preferably in contact with the reaction mixture. Preferably, the reaction is carried out in a revolving rotary furnace operated on a parallel or concurrent basis, that is, a furnace in which the feed magnesium chloride hydrate and gases of combustion pass in the same direction through the furnace. When such a furnace is employed, the feed magnesium chloride hydrate will preferably be in the form of coarse particles having an average mesh size of from about +4 to about ½ inch in diameter. By firing the furnace directly at the feed entrance and providing for withdrawl of the combustion gases at the discharge port of the furnace, the atmosphere above the feed near the entrance to the furnace can be easily controlled to contain a minimum of hydrogen chloride and at least 10% water, by weight. The water content of the atmosphere is supplied by the burning combustion gases and by partial dehydration of the magnesium chloride hydrate. By operating in this manner, the heating of the magnesium chloride hydrate to the decomposition temperature is effected in an atmosphere substantially entirely free of hydrogen chloride, the velocity of combustion gases being sufficiently high to remove hydrogen chloride from the reaction mass as quickly as it is formed. Concurrent operation of a rotary furnace thus provides a very practical means for raising the temperature of the fresh feed of magnesium chloride hydrate very rapidly to the decomposition temperature, while at the same time providing the most desirable atmospheric conditions for obtaining an efficient decomposition of feed without melting. By firing the furnace with natural gas and providing for an efficient mixture of air and gas to produce a stable flame, the moisture content of the atmosphere above the reaction mass in the furnace will generally amount to at least about 15%, by weight, and usually more than about 20%, by weight. This water comes about not only as a result of combustion of the natural gas, but also from the splitting off of the water of hydration from the magnesium chloride hydrate.

In a preferred embodiment of this invention, the decomposition of the magnesium chloride hydrate is carried out in a sloping elongated cylindrical furnace, which revolves about its axis in a plane slightly inclined from the horizontal, the input end of the furnace being higher than the discharge end. The dimensions of the furnace may be varied widely, but a cylinder, in which the ratio of diameter to length is between about 1:10 and about 1:30, is preferred. During the decomposition reaction, the decomposition chamber is revolved at a rate between about 10 and about 120 revolutions per hour. The slope of the chamber will depend to a large extent upon its length and diameter and the desired rate of throughput, but a slope of the order of about ⅜ inch drop per foot has been found to be satisfactory. A slope and rotation rate are desirable which permit the reaction mixture to remain in the decomposition chamber for a period ranging between about 30 minutes and about 2 hours, during which time decomposition of hydrated magnesium chloride is substantially entirely completed.

The figure shows a rotary furnace 1 lined with fire brick 2 and directly fired at the input end by burning combustion gases entering through pipe line 3. Feed magnesium chloride hydrate enters through conduit 4 forming a bed 6 of the feed material at the bottom of the combustion chamber in contact with the flame 5 of burning combustion gases, said bed being of the order of about 2.4 times deeper at the input end of the furnace than at the discharge end. Rotation of the furnace by means of the gear box and power supply 7 tumbles the mixture and moves it longitudinally toward the discharge port. Gases of combustion and decomposition move concurrently with the reaction mass through the furnace and are withdrawn by way of conduit 8 and converted to concentrated hydrochloric acid in the absorbers 9. The solid reaction product discharged from the furnace is conveyed by chute 10 to purifiers.

The furnace is heated by burning combustion gases just inside the input end of the chamber. The burned gases pass through the chamber concurrently with the feed and are discharged at the lower end of the chamber. In order to achieve a quick heating of the magnesium chloride dihydrate feed, the feed is preferably passed directly through the flame of the burning combustion gases at the entrance to the combustion chamber. The feed then forms a bed on the bottom of the chamber and revolution of the chamber about its axis results in a tumbling of the reaction mass accompanied by movement of the bed toward the discharge end of the chamber. It is desirable to maintain the reaction mass in the form of a deep bed to expose maximum area of the feed to the heat. In a decomposition chamber having an internal diameter of about 6 feet and a length of about 70 feet and an inclination of about ⅜ inch per foot, it is desirable to maintain the bed at a depth of about 2 feet at the feed end and about 6 inches at the discharge end by means of retaining rings. Rotation of such a chamber at about 40 R. P. H. will provide a residence time for the feed of about 45 minutes and afford complete conversion of the magnesium chloride hydrate to magnesium oxide and hydrochloric acid.

In carrying out the process of this invention in a decomposition chamber of the type described above and operating the chamber concurrently, that is, heating the feed directly as it enters the chamber and maintaining the flow of burned combustion gases in the same direction as the flow of feed through the chamber, it is possible to decompose hydrated magnesium chloride substantially completely to produce magnesium oxide without melting of the reaction mixture and without adhesion of the reaction mixture to the walls of the decomposition chamber. By operating in this manner, it has been found that the atmosphere in the decomposition chamber above the reaction mass can be maintained with a water content of at least 10% and a hydrogen chloride content less than 20%, by weight. During the initial heating of the feed, the amount of hydrogen chloride in the atmosphere above the feed will be less than about 5%, by weight, thus providing the most advantageous conditions for efficient decomposition of the magnesium chloride dihydrate without melting.

The following examples illustrate specific embodiments of the invention. All parts and percentages are by weight unless otherwise specified.

EXAMPLE I

A rotary kiln about 28 feet long having an internal diameter of about 14 inches and inclined slightly downward toward the discharge end was rotated at about 2 revolutions per minute while being continuously charged with about 3.6 lbs. per minute for a total of about 145 minutes with a magnesium chloride hydrate flake of between about +4 mesh and about ½ inch diameter particle size. The feed material, which was at room or atmospheric temperature, had the following approximate analysis:

*Wt. percent*

| K | Total Mg. | H₂O Sol. | Ca | Na | Cl | SO₄ | H₂O |
|---|---|---|---|---|---|---|---|
| 1.84 | 18.10 | 15.90 | 0.16 | 0.77 | 48.90 | 0.71 | 28.07 |

The kiln was heated concurrently with the flow of feed by burning natural gas having a heat rating of about 1000 B. t. u. per cubic foot at the rate of about 8.2 cubic feet per minute, this giving a heat input of about 2260 B. t. u. per pound of feed introduced. Under these conditions the feed material formed a bed of about 6 inches in depth at the feed end, about 2 inches at the product discharge end of the kiln, and the residence time of the feed in the kiln averaged between about 65 minutes to about 75 minutes. The flame in the kiln was directed just above the surface of the bed, but was at times in contact with the bed. A retaining ring of about 1.5 inches in height was used on the outlet end of the kiln to maintain the bed at constant depth. The feed was raised to a temperature of about 500° C. in about 10 minutes. The atmosphere in the furnace had a moisture content of about 25%, by weight, and a maximum hydrochloric acid content of about 18% at the discharge port and a minimum hydrochloric concentration of about 3% at or near the input end.

The discharged material was a crude magnesium oxide having a temperature of about 500° C. with the following approximate analysis:

*Wt. percent*

| K | Total Mg. | Ca | Na | Cl | SO₄ |
|---|---|---|---|---|---|
| 4.21 | 48.60 | 0.38 | 1.80 | 11.63 | 1.55 |

The final product showed a conversion of the magnesium chloride of the feed to magnesium oxide of about 96.4%. There was no melting or ringing of the furnace during this decomposition operation.

EXAMPLE II

A rotary kiln about 70 feet long and about 6 feet in internal diameter and inclined downward toward the discharge end of the kiln at an angle of about 3/8 inch per foot was rotated at about 40 revolutions per hour. To the feed inlet of this kiln was added continuously a magnesium chloride hydrate flake material having a temperature of about 50° C. at the rate of about 2.75 tons per hour. The feed had a particle size ranging from about +4 mesh to about 1/2 inch in diameter and had the following approximate analysis:

Wt. percent

| KCl | NaCl | MgSO₄ | MgCl₂ | MgO | H₂O | Ratio of Mols H₂O to Mols MgCl₂ |
|---|---|---|---|---|---|---|
| 1.34 | 1.25 | 2.83 | 62.53 | 1.33 | 30.72 | 2.60 |

The kiln was operated concurrently, that is, the feed and combustion gases were added at the same end of the kiln. The heat was supplied by burning natural gas having the same heat rating as in the preceding example at the rate of about 2150 B. t. u. per pound of feed added (about 200 cubic feet per minute). The feed material formed a bed of about 24–30 inches at its deepest point at the feed end and averaged about 5 inches in depth at its deepest point at the outlet end of the kiln. The residence time of the material in the kiln was between about 80 minutes and 120 minutes with average time generally being about 92–100 minutes. The feed, which had a temperature of about 50° C. prior to entry into the furnace, was raised to about 500° C. in less than 15 minutes following entry into the furnace. The product discharged from the kiln had a temperature of about 550° C. The product was a crude magnesium oxide having the following approximate analysis:

Wt. percent

| KCl | NaCl | MgSO₄ | MgCl₂ | MgO |
|---|---|---|---|---|
| 3.80 | 3.57 | 8.21 | 3.01 | 81.41 |

The final product showed a conversion of the magnesium chloride of the feed to magnesium oxide of about 98.4%. There was no ringing or melting during the decomposition operation.

Having thus fully described and illustrated the character of the instant invention, what is desired to be secured by Letters Patent is:

1. A process for producing magnesium oxide comprising decomposing, without substantial melting, a solid phase magnesium chloride hydrate containing an average of between about 1.5 mols and about 3.0 mols of water of hydration per mol of magnesium chloride by heating a moving bed of said solid phase magnesium chloride hydrate with hot combustion gases moving concurrently with said bed to a decomposition temperature of between about 400° C. and about 800° C. in less than about 30 minutes, while maintaining the said solid phase in an atmosphere containing less than 10% by weight of hydrogen chloride and more than 10% by weight of water vapor, and maintaining the feed material at the decomposition temperature until substantial amounts of magnesium oxide have been produced.

2. A process as in claim 1 wherein the magnesium chloride hydrate feed reaches the decomposition temperature in less than 15 minutes.

3. A process as in claim 2 wherein the magnesium chloride hydrate contains an average of between about 2 mols and about 2.6 mols of water of hydration per mol of magnesium chloride.

4. A process as in claim 2 wherein the atmosphere during the initial decomposition contains between about 10 and about 30% by weight of water vapor.

5. A process as in claim 1 wherein the magnesium chloride hydrate feed material contains alkali metal chloride but in an amount less than about 6% by weight of the magnesium chloride hydrate feed material.

6. A process as in claim 2 wherein the magnesium chloride hydrate feed material contains alkali metal chloride but in an amount less than about 6% by weight of the feed material.

7. A process for producing magnesium oxide comprising decomposing, without substantial melting, a solid phase magnesium chloride hydrate containing an average of between about 1.5 mols and about 3.0 mols of water of hydration per mol of magnesium chloride by heating a moving bed of said solid phase magnesium chloride hydrate by initial direct contact of an open flame on said bed, the combustion gases moving concurrently with the bed, to a decomposition temperature of between about 400° C. and about 800° C. at a rate of heating of at least about 10° C. per minute while maintaining less than 10% by weight of hydrogen chloride and more than 10% by weight of water vapor in the atmosphere and maintaining the feed material at the decomposition temperature until substantial amounts of magnesium oxide have been produced.

8. A process as in claim 7 wherein the rate of heating to the decomposition temperature is at least about 30° C. per minute.

9. A process as in claim 8 wherein the magnesium chloride hydrate contains an average of between about 2 mols and about 2.6 mols of water of hydration per mol of magnesium chloride.

10. A process as in claim 8 wherein the atmosphere during the initial decomposition contains between about 10 and about 30% by weight of water vapor.

11. A process as in claim 7 wherein the magnesium chloride hydrate feed material contains alkali metal chloride but in an amount less than about 6% by weight of the magnesium chloride hydrate feed material.

12. A process as in claim 8 wherein the magnesium chloride hydrate feed material contains alkali metal chloride but in an amount less than about 6% by weight of the feed material.

13. A process as in claim 8 wherein the feed material comprises essentially a mixture of a major amount of magnesium chloride hydrate and a minor amount of magnesium chloride tetrahydrate.

14. A process for producing magnesium oxide comprising decomposing, without substantial melting, a solid phase magnesium chloride hydrate containing an average of between about 1.5 mols and about 3.0 mols of water of hydration per mol of magnesium chloride by concurrently heating a moving bed of said solid phase magnesium chloride hydrate to a decomposition temperature of between about 400° C. and about 800° C. at a rate of heating of at least about 10° C. per minute while maintaining less than 10% by weight of hydrogen chloride and more than 10% by weight of water vapor in the atmosphere and maintaining the feed material at the decomposition temperature until substantial amounts of magnesium oxide have been produced.

15. A process as in claim 14 in which the moving bed is heated by direct contact of an oxidizing flame on the bed of magnesium chloride hydrate feed material.

16. A process as in claim 15 in which the magnesium chloride hydrate contains between about 2.0 mols and about 2.6 mols of water of hydration per mol of magnesium chloride.

17. A process as in claim 15 wherein the magnesium chloride hydrate contains alkali metal chloride but in an amount less than about 6% by weight.

18. A process in accordance with claim 15 in which the rate of heating to the decomposition temperature is at least 30° C. per minute.

19. A process as in claim 14 wherein the heating of the magnesium chloride hydrate feed material is of a moving bed which passes through a direct fired rotary furnace concurrently with the flame and combustion gases, the flame of the heat source being in direct contact with the surface of the bed of solid phase hydrated magnesium chloride.

20. A process as in claim 19 wherein the rate of heating is at least 30° C. per minute to the decomposition temperature and wherein the material being fed to the furnace is maintained at the decomposition temperature for a period of between about 30 minutes and about 120 minutes.

21. A process as in claim 20 wherein the flame of the heat source is an oxidizing flame and wherein the feed material comprises a major portion of magnesium chloride dihydrate and a minor portion of magnesium chloride tetrahydrate.

References Cited in the file of this patent

UNITED STATES PATENTS

| | | |
|---|---|---|
| 2,413,292 | Christensen | Dec. 31, 1946 |
| 2,473,534 | Lloyd | June 21, 1949 |